United States Patent
Fuchiwaki

(10) Patent No.: US 8,094,530 B2
(45) Date of Patent: Jan. 10, 2012

(54) OPTICAL DISC READ/WRITE APPARATUS AND ALTERNATIVE WRITE PROCESSING METHOD

(75) Inventor: Atsushi Fuchiwaki, Yokohama (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 1065 days.

(21) Appl. No.: 11/625,413

(22) Filed: Jan. 22, 2007

(65) Prior Publication Data

US 2007/0286044 A1    Dec. 13, 2007

(30) Foreign Application Priority Data

Jun. 8, 2006    (JP) .................... 2006-159521

(51) Int. Cl.
- G11B 5/58 (2006.01)
- G11B 11/00 (2006.01)
- G11B 20/10 (2006.01)

(52) U.S. Cl. ............... 369/53.16; 369/53.36; 369/47.14

(58) Field of Classification Search .................. None
See application file for complete search history.

(56) References Cited

U.S. PATENT DOCUMENTS

| | | | |
|---|---|---|---|
| 2001/0021983 A1* | 9/2001 | Ono et al. | 714/8 |
| 2004/0004917 A1* | 1/2004 | Lee | 369/47.14 |

FOREIGN PATENT DOCUMENTS

| | | |
|---|---|---|
| JP | 11-025590 | 1/1999 |
| JP | 2000-339874 | 12/2000 |
| JP | 2005-293779 | 10/2005 |
| JP | 2006-085797 | 3/2006 |

* cited by examiner

Primary Examiner — Wayne Young
Assistant Examiner — Carl Adams
(74) Attorney, Agent, or Firm — Antonelli, Terry, Stout & Kraus, LLP.

(57) ABSTRACT

When data is to be written on an optical disc in the unit of a sector, an attempt is made to read a block A to which a write sector belongs for the purpose of judging whether the block can be normally read. If the block A is not successfully read, it is judged to be a defective area, and an alternative write is performed in an alternative area in the unit of a sector. The alternative write may be performed so that a plurality of sectors belonging to the same block are dispersively written in different blocks d, E. When new data is to be written in a new sector in such a situation, data is acquired from the dispersed other sectors, merged with the new data, and collectively rewritten in the same block E.

11 Claims, 7 Drawing Sheets

OPTICAL DISC READ/WRITE APPARATUS AND ALTERNATIVE WRITE PROCESSING METHOD

CLAIM OF PRIORITY

The present application claims priority from Japanese application JP 2006-159521, filed on Jun. 8, 2006, the content of which is hereby incorporated by reference into this application.

BACKGROUND OF THE INVENTION (1) Field of the Invention

The present invention relates to an optical disc read/write apparatus and alternative write processing method for performing an alternative write for a defective area on an optical disc when data is to be written onto the optical disc.

(2) Description of the Related Art

If a defective area is encountered in a data area when an attempt is made to write data onto a DVD or other optical disc, a method for performing an alternative write in the unit of a defective block by using an alternative area is employed to enhance there liability of the data to be written. If a request for performing a write in the unit of a sector is received although a write is performed on the disc in the unit of a block, a Read Modify Write process (herein after referred to as the RMW process) is performed. This process reads from the disc the data in a block that contains a requested sector, writes requested write data over the read data, and writes the resulting data in the unit of a block. The RMW process makes it possible to effectively perform a write and alternative write in the unit of a sector. The following technologies, which relate to improving an alternative process of an optical disc drive, are proposed.

A defect management method disclosed by Japanese Patent Japanese Patent Laid-Open No. 2005-293779 includes a process that divides an alternative block into a plurality of subblocks and sets identification information within defect management information for the purpose of differentiating replaced subblocks in which the data is replaced from unreplaced subblocks in which the data is not replaced when the alternative block (ECC block M) in an alternative area replaces an ECC block N containing a defective area on a DVD+RW disc.

A control function disclosed by Japanese Patent Japanese Patent Laid-Open No. 2000-339874 stores only the address of a defective block at the time of a continuous read and performs an alternative process after termination of the continuous read in order to prevent a real-time write operation from being interrupted by an alternative process during the use of a DVD-RAM disc.

The invention disclosed by Japanese Patent Japanese Patent Laid-Open No. 2006-85797 includes storage means for rearranging alternative sectors and writes rearranged data in an alternative area in order to avoid an increase in the seek time required for an alternative process in a situation where physically arranged alternative blocks in an alternative area are not written in the order of the addresses of defective blocks in a user area.

SUMMARY OF THE INVENTION

According to the technology disclosed by Japanese Patent Japanese Patent Laid-Open No. 2005-293779, the data can be replaced in a subblock, which is smaller than a block, even when defect management is exercised in the unit of a block. At the time of a read, the identification information for differentiating replaced subblocks from unreplaced subblocks can be used to judge whether an alternative block is to be read.

If a read performed to write data in the unit of a sector during the RMW process is not successful, specified data to be written in an alternative write process is alternatively written in an alternative area (first) in the unit of a sector. Further, when new data is to be written in the unit of a sector, the RMW process is performed to read from the alternative area. However, if such a read operation fails, an alternative write is repeatedly performed by using another alternative area (second). Consequently, the data originally contained in one block are written dispersively in a plurality of alternative blocks. If, in such an instance, a write instruction is issued again for the above block, it is necessary to read from the plurality of blocks during the RMW process. As a result, the time required for a read/write process increases to the detriment of a high-speed write.

The above-mentioned Japanese patents have not considered an increase in the read/write processing time that is caused when write data in the unit of a sector are dispersed into a plurality of alternative blocks.

It is an object of the present invention to reduce the read/write processing time by storing dispersed data in an alternative block with high efficiency when an alternative write process is performed in the unit of a sector.

The present invention provides an optical disc read/write apparatus that performs an alternative write by using an alternative area on an optical disc if a defect is detected in a write area of the optical disc when an attempt is made to write data on the optical disc in the unit of a sector. The optical disc read/write apparatus includes a spindle motor, which rotates the optical disc; a pickup, which irradiates the optical disc with laser light to read/write data; a read/write circuit, which processes read and write signals for the pickup; a servo circuit, which controls the rotation of the spindle motor and the movement of the pickup; and a microprocessor, which controls a data read/write process and alternative write process in the unit of a sector via the read/write circuit and servo circuit. The microprocessor checks whether a block containing a write sector can be normally read. If the block is not successfully read, the microprocessor judges that the block is a defective area, and performs an alternative write in the alternative area in the unit of a sector. When new data is to be written in a new sector in a situation where a plurality of sector belonging to the same block are dispersively written in different blocks as a result of the alternative write, the microprocessor acquires data from the other sectors that are dispersed, merges the acquired data of the other sectors with the new data, and collectively rewrites the merged data in the same block.

If there are a plurality of dispersed other sectors, the microprocessor performs a merge operation after acquiring data from only a sector generated by the last alternative write.

The present invention also provides an alternative write processing method that is used to perform an alternative write by using an alternative area on an optical disc if a defect is detected in a write area of the optical disc when an attempt is made to write data on the optical disc in the unit of a sector. The method checks whether a block containing a write sector can be normally read. If the block is not successfully read, the method judges that the block is a defective area, and performs an alternative write in an alternative area in the unit of a sector. When new data is to be written in a new sector in a situation where a plurality of sectors belonging to the same block are dispersively written in different blocks as a result of the alternative write, the method acquires data from the other sectors that are dispersed, merges the acquired data of the other sectors with the new data, and collectively rewrites the merged data in the same block.

According to the present invention, it is possible to increase the write speed by reducing the read/write processing time required for an alternative write process.

BRIEF DESCRIPTION OF THE DRAWINGS

Exemplary embodiments of the present invention will be described in detail based on the following figures, wherein.

DETAILED DESCRIPTION OF THE EMBODIMENTS

Figure 1:
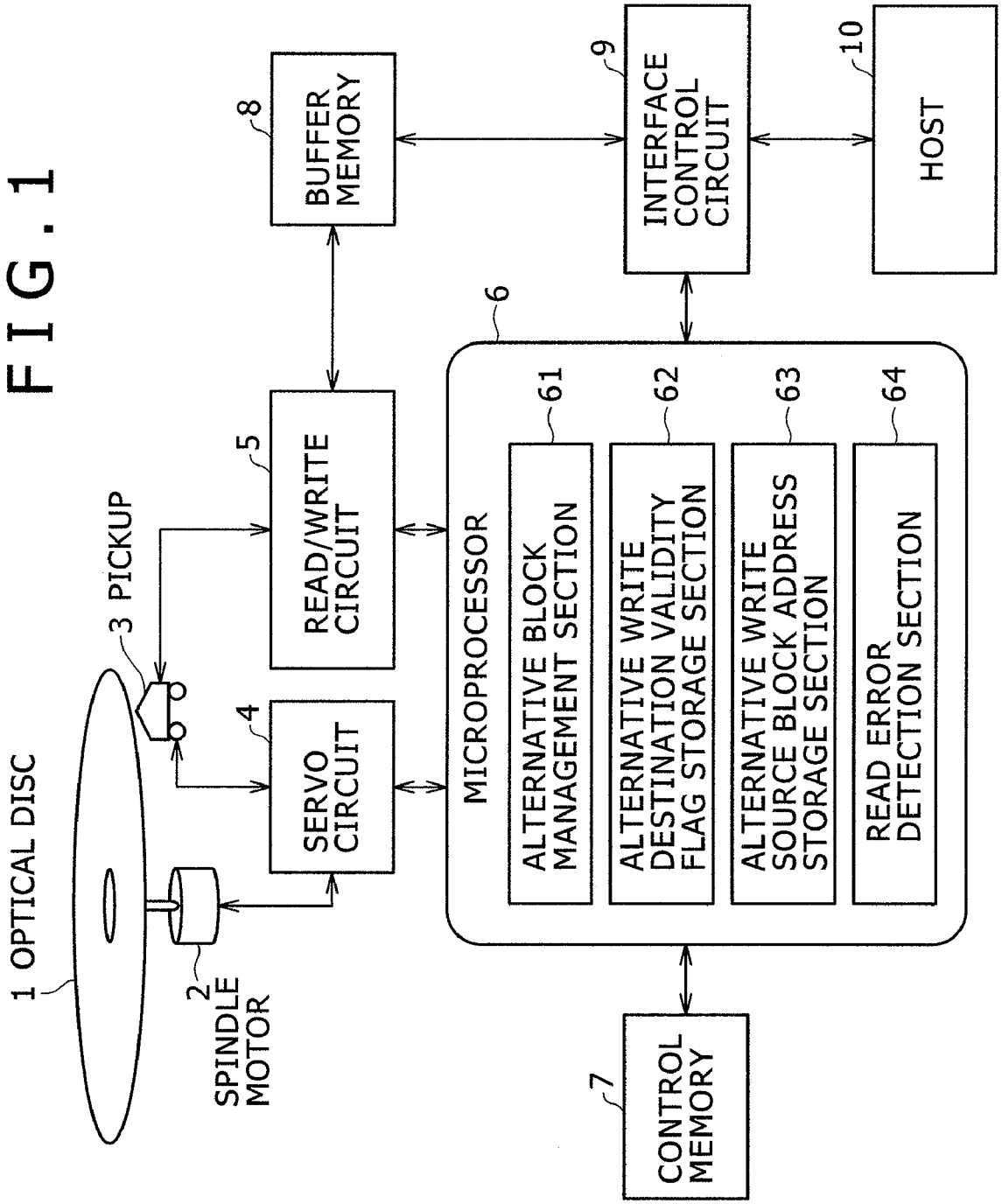
FIG. 1 is a block diagram illustrating the configuration of an optical disc read/write apparatus according to the present invention.

FIG. 1 is a block diagram illustrating the configuration of an optical disc read/write apparatus according to the present invention. An optical disc 1 is rotated by a spindle motor 2 at a predetermined speed. A pickup 3 includes a laser light source, a photodetector, and an optical lens system, and irradiates the optical disc 1 with laser light to read/write data. A servo circuit 4 controls the rotation of the spindle motor 2 and the radial position of the pickup 3 relative to the optical disc, and provides tracking direction control and focusing direction control. A read/write circuit 5 performs a write process, for instance, for modulating or compensating the write signal to be supplied to the pickup 3 and a read process, for instance, for binarizing, demodulating, decoding, or providing error correction on a signal read by the pickup 3. Read/write data is temporarily stored in a buffer memory 8 and transferred to or from a personal computer or other host 10 connected to the outside via an interface control circuit 9. Upon receipt of a command from the host 10, the microprocessor 6 controls the servo circuit 4, the read/write circuit 5, and the interface control circuit 9 to control various processes, for instance, for performing normal read/write operations and alternative write operations in relation to defective areas. A control memory 7 stores programs and data required for control.

To perform an alternative write process, the microprocessor 6 has functions described below. An alternative block management section 61 manages an alternative block and controls an alternative write process sequence. An alternative write destination validity flag storage section 62 stores an alternative write destination validity flag (information indicating whether the data in sectors of an alternative block are valid). An alternative write source block address storage section 63 stores the address of a source block involved in an alternative write. If an error is detected when a block specified for a write is read, a read error detection section 64 judges that the block is defective. An alternative address and other items of information about an alternative write are written in a management area of the optical disc 1 and read to control the alternative write process.

In the embodiments of the present invention, upon receipt of a data write instruction from the host 10 for writing data in the unit of a sector, the microprocessor 6 causes the pickup 2 to access a block on the disc to which a target sector belongs, and checks whether the block can be normally read. If the block can be normally read, the microprocessor 6 writes sector data in the block. However, if the block is not successfully read (an error is detected), the microprocessor 6 judges that the block is a defective area, and performs an alternative write process (RMW process) on an alternative area (alternative block) on the disc in the unit of a sector. When an alternative write is repeatedly performed, a plurality of sectors belonging to the same block may be dispersively written in different blocks. When new sector data is to be written in such a situation, the embodiments of the present invention merges the other sector data belonging to the same block and collectively rewrites the merged data in the same block.

As described above, the apparatus according to the present embodiment can reduce the time required for subsequent read/write processing by collectively storing the sector data belonging to the same block in the same block.

Before describing the embodiments of the present invention in detail, the alternative write process that is performed for a defective area in the unit of a sector will now be described with reference to FIGS. 2 to 4.

Figure 2:
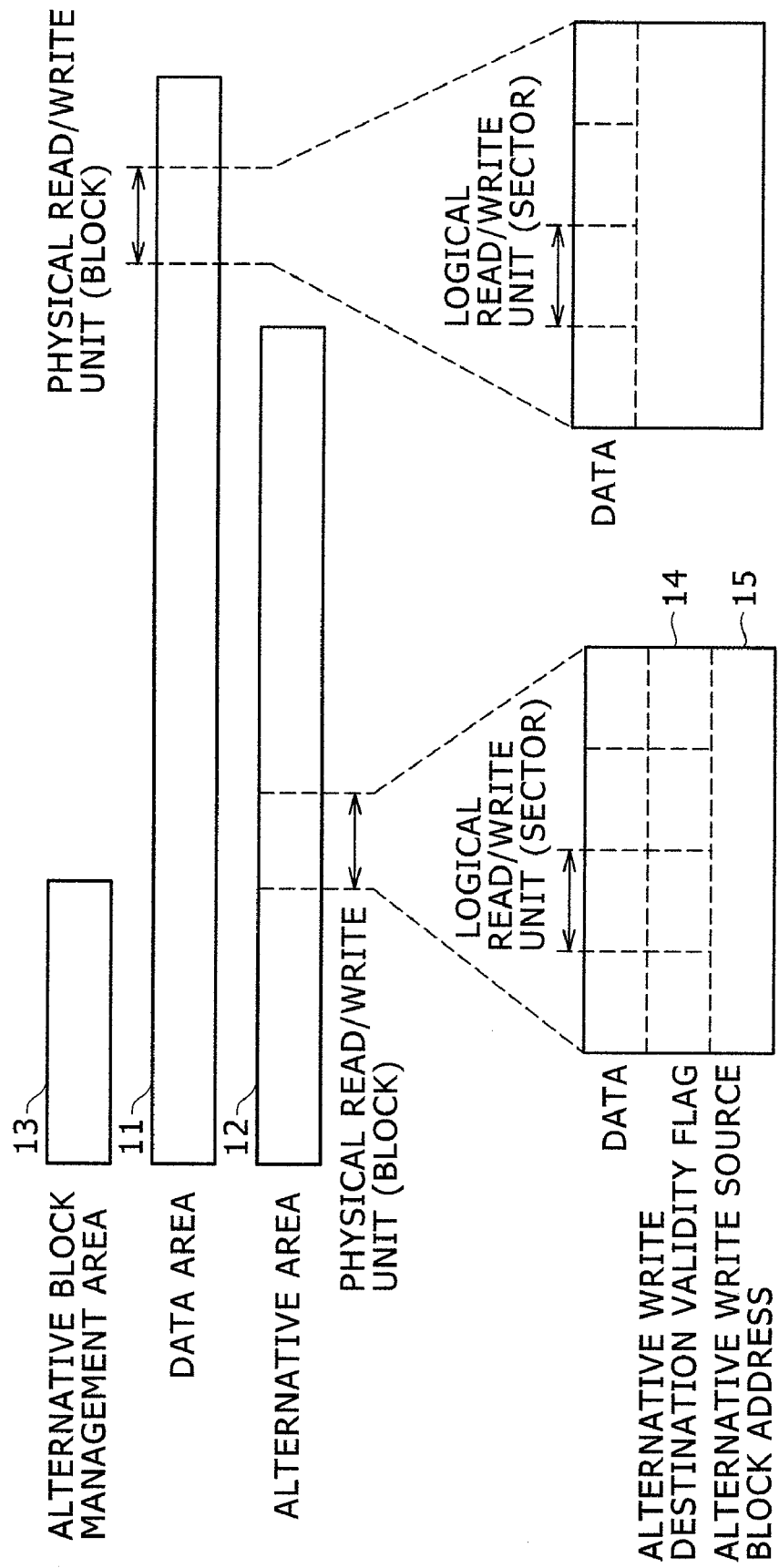
FIG. 2 shows a typical area configuration of an optical disc according to embodiments of the present invention.

FIG. 2 shows a typical area configuration of an optical disc according to the embodiments of the present invention. A data area 11 is an area where user data is written. An alternative area 12 is used for an alternative write when, for instance, a read error or other defect exists in the data area 11, and provided on the inner and outer sides of the data area 11. An alternative block management area 13 is an area for registering the relationship between an alternative write source block address and alternative write destination block address for an alternative write.

The read/write data on the disc is handled in the unit of a block, which is the unit of a physical read/write. However, when the read/write data is handled in relation to the host, it is handled in the unit of a sector, which is the unit of a logical read/write. An alternative process can be performed on the alternative area 12 in the unit of a sector. The alternative write destination validity flag 14, which indicates whether the data in individual sectors are valid, and the alternative write source block address 15 are written in the alternative area 12.

Figure 3:
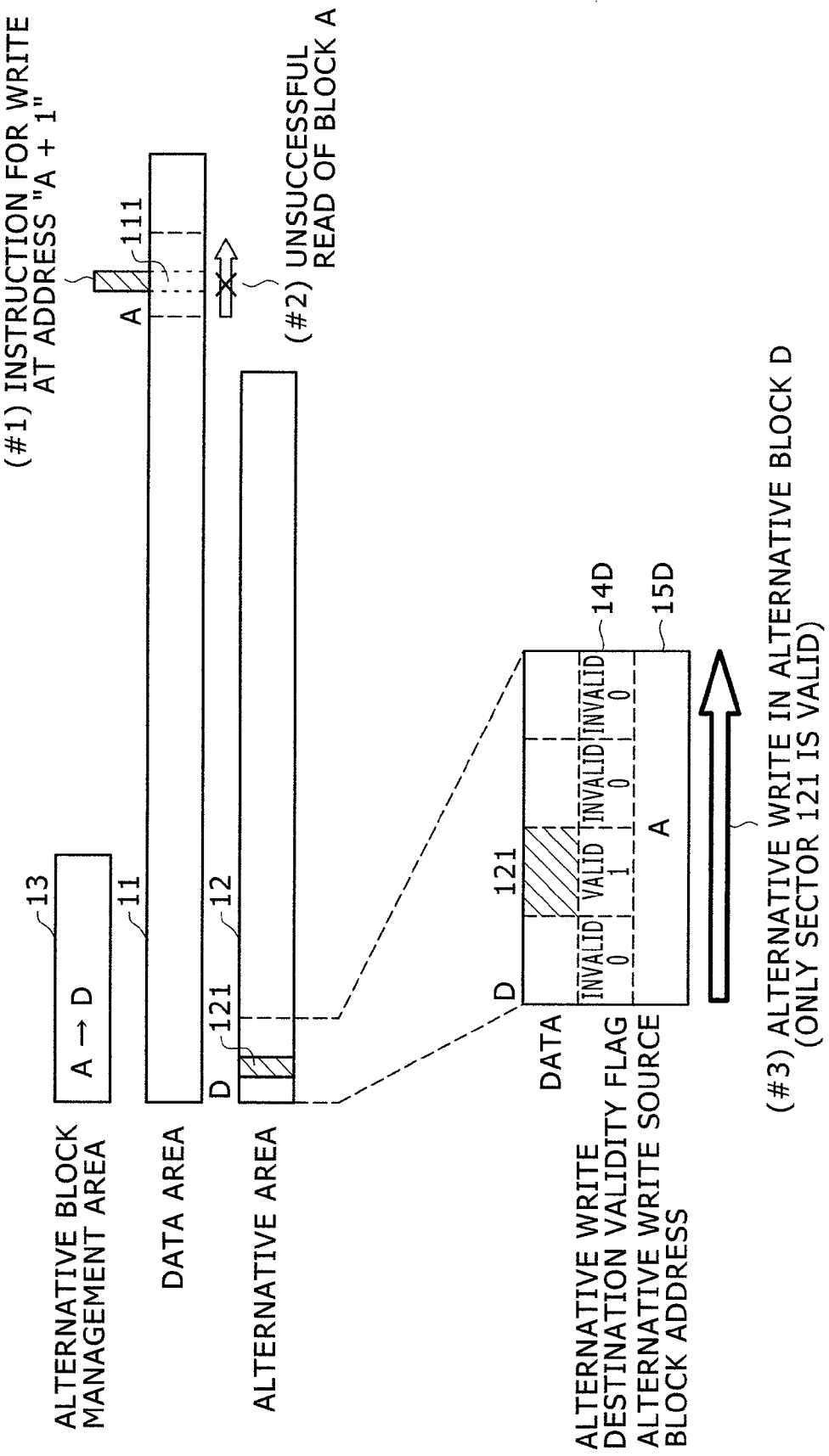
FIG. 3 illustrates a first alternative write process for a defective area.

FIG. 3 illustrates a first alternative write process that is performed when an instruction for performing a write in the unit of a sector was received from the host and the block to which the sector belongs was not successfully read.

(1) When the host designates a sector 111 (address "A +1") of the data area 11 as a write position, the block (address "A") to which the designated sector belongs is read in accordance with an RMW process procedure. If the read is normally performed, the data fed from the host is written in the block (the new data overwrites the data in the sector).

(2) If an abnormality is detected during the read (if the read is unsuccessful), the block is judged to be defective.

(3) The sector data fed from the host is then alternatively written in an alternative sector 121 (address "D") of the alternative area 12. In this instance, the entire block at address "D" is subjected to an alternative write; however, only the data in the associated sector 121 is meaningful. Therefore, "valid (1)" is given to the sector 121 as the alternative write destination validity flag 14, whereas "invalid (0)" is given to the other sectors. Further, address "A", which is the address of the block that was not successfully read, is given as the alternative write source block address 15. Furthermore, "A→D" is registered in the alternative block management area 13 as the address information about the alternative write source and destination.

Figure 4:
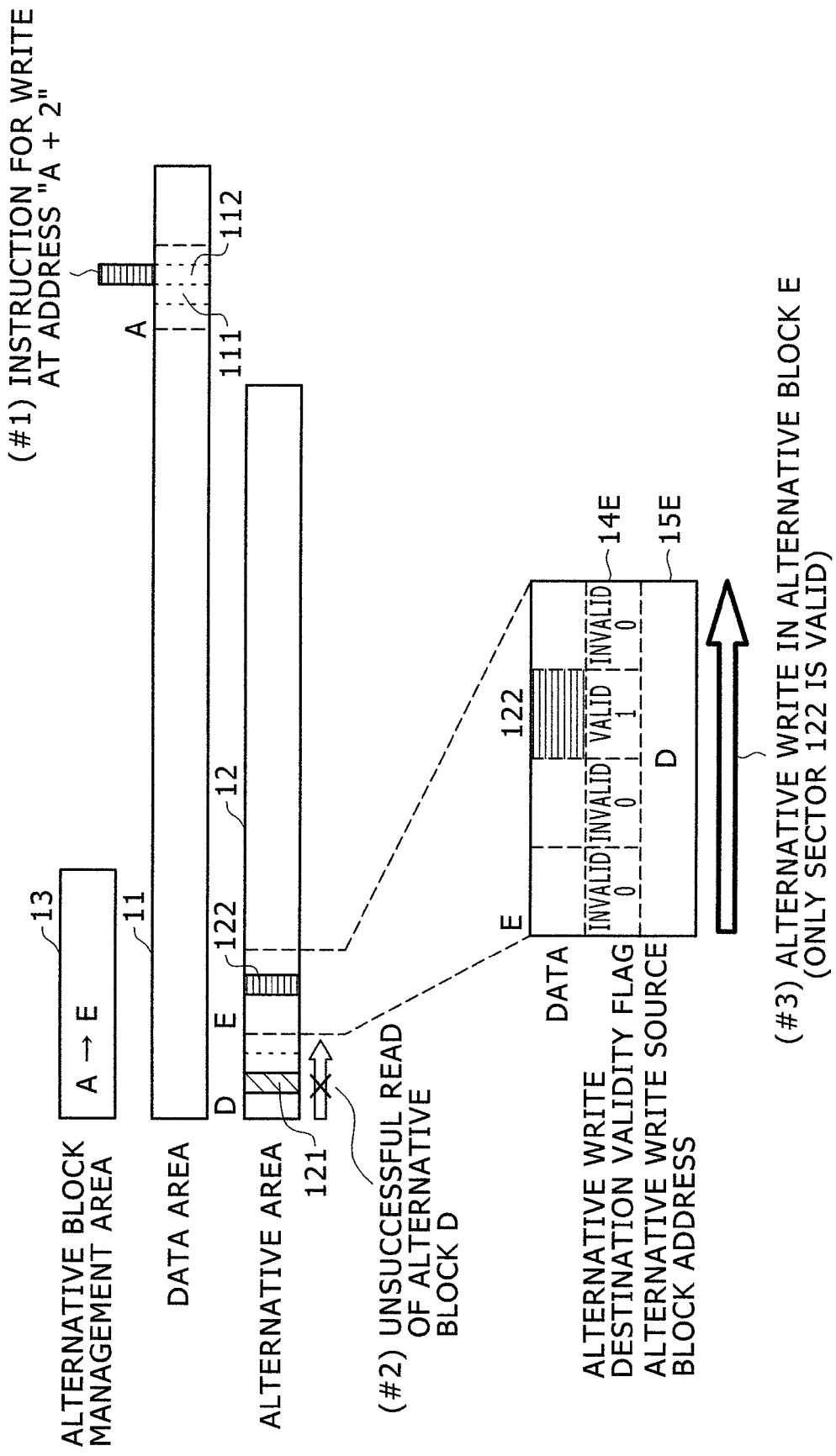
FIG. 4 illustrates a second alternative write process for a defective area.

FIG. 4 illustrates a second alternative write process that is performed when an instruction for performing a write in another sector of the above-mentioned block was received from the host in the state shown in FIG. 3 (in which the first alternative write was already performed) and the alternative write destination block was not successfully read.

(1) When the host designates a sector 112 (address "A+2") of the data area 11 as a write position, an attempt is made to read the block (address "A") to which the designated sector belongs. However, the block was already judged to be defective, and an alternative write was performed at address "D," which represents an alternative area (it is revealed when the information about the alternative block management area 13 shown in FIG. 3 is referenced). In this instance, therefore, the alternatively written block (address "D") is read.

(2) If an abnormality is detected during the read (if the read is unsuccessful), the alternative block is judged to be defective.

(3) The sector data fed from the host is then alternatively written for a second time in an alternative sector 122 of another alternative block (address "E") in the alternative area 12. "Valid (1)" is given to the sector 122 as the alternative write destination validity flag 14, whereas "invalid (0)" is given to the other sectors. Further, address "D," which is the address of the block that was not successfully read, is given as the alternative write source block address 15. Furthermore, "A→E" is registered in the alternative block management area 13 as the address information about the first alternative write source and the last alternative write destination.

When an alternative write is repeatedly performed due to an unsuccessful read of an alternative block as described above, a plurality of alternative blocks are generated (e.g., two alternative blocks at addresses "D" and "E" in FIG. 4) so that the data in a plurality of sectors are dispersively written although they should be stored in a single block (address "A").

Meanwhile, if at least one alternative block is generated and readable, the speed and efficiency of a subsequent read/write process can be increased by merging and rewriting the dispersed data. Examples of an alternative write process that achieves the above purpose will be described below.

FIRST EMBODIMENT

Figure 5:
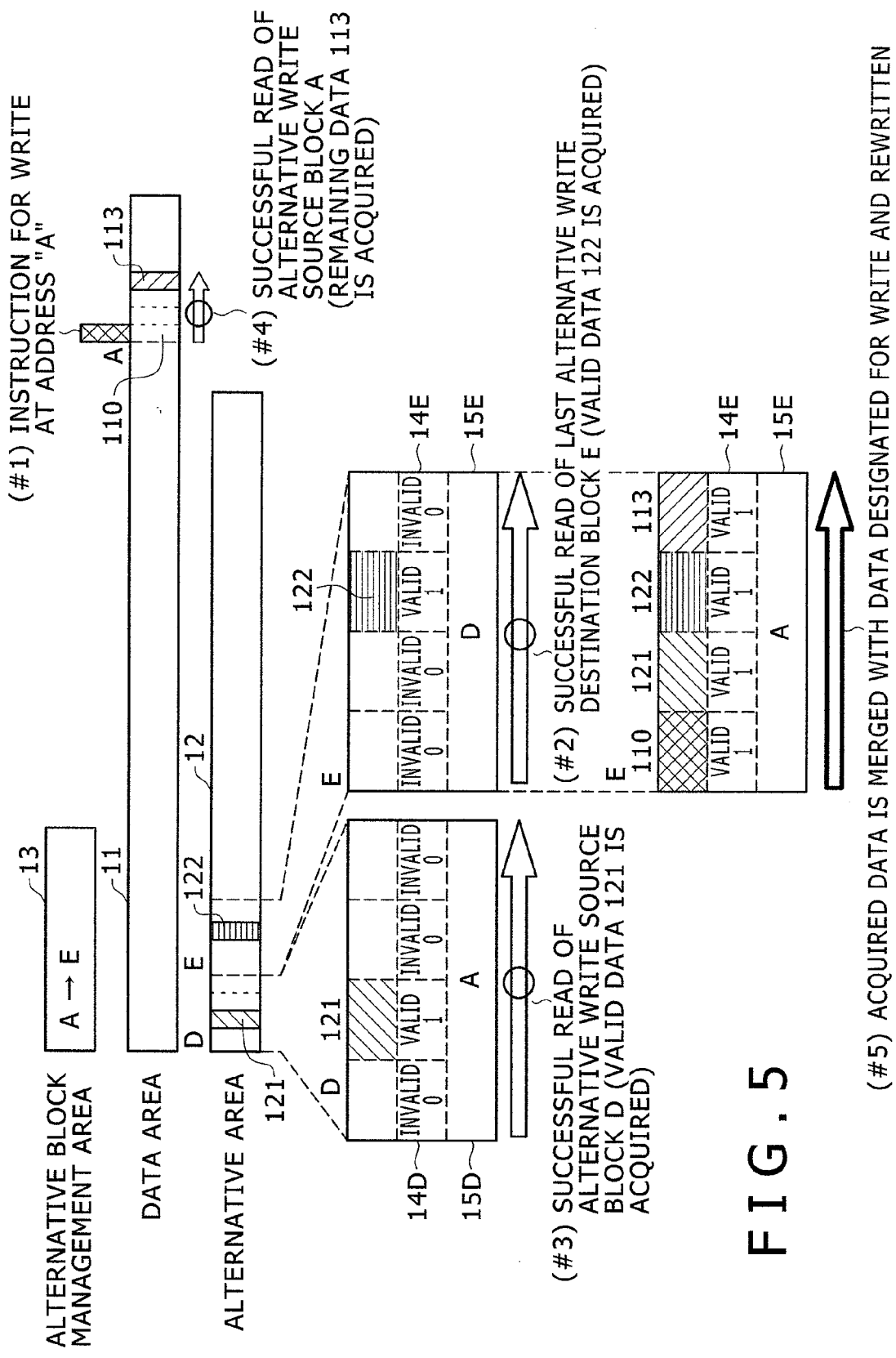
FIG. 5 illustrates an alternative write process according to a first embodiment of the present invention.

FIG. 5 illustrates an alternative write process according to a first embodiment of the present invention. The subsequent description relates to an alternative write process that is performed in a situation where two alternative blocks (addresses "D" and "E") are already generated as indicated in FIG. 4, an instruction for performing a write in another sector 110 of the above block is received from the host, and the alternative write destination block at address "E" can be read.

(1) When an instruction for performing a write in another sector 110 (address "A") of the above block is received from the host, the alternative block management area 13 is referenced to find that the last alternative write destination block is at address "E".

(2) The alternative write destination block (address "E") is read. The alternative write destination validity flag 14E is referenced to acquire the data in the sector 122 as valid data.

(3) Further, the alternative write source block address 15E is referenced to read the immediately preceding alternative write source block (address "D"). It is assumed here that the data in the sector 121 is acquired as valid data.

(4) Further, the alternative write source block address 15D is referenced to read the alternative write source block (address "A"). If any valid data remains, it is acquired. It is assumed here that valid data is acquired from the sector 113.

(5) After the valid data is entirely acquired from the sectors belonging to the block as described above, it is merged with the data (sector 110) that is designated for a write by the host, and rewritten in the alternative block at address "E."

The data in the four sectors belonging to the block are now stored together in the same block. Therefore, the block can be subsequently handled simply by accessing one block (address "E"). This increases the speed of subsequent read/write processing. In processing steps (3) and (4) above, however, a retry is performed to read the blocks (addresses "D" and "A") that were unsuccessfully read. Therefore, the process according to the present embodiment is suitable for a situation where a sufficient amount of time is available for alternative processing, for instance, for making disk repairs.

SECOND EMBODIMENT

Figure 6:
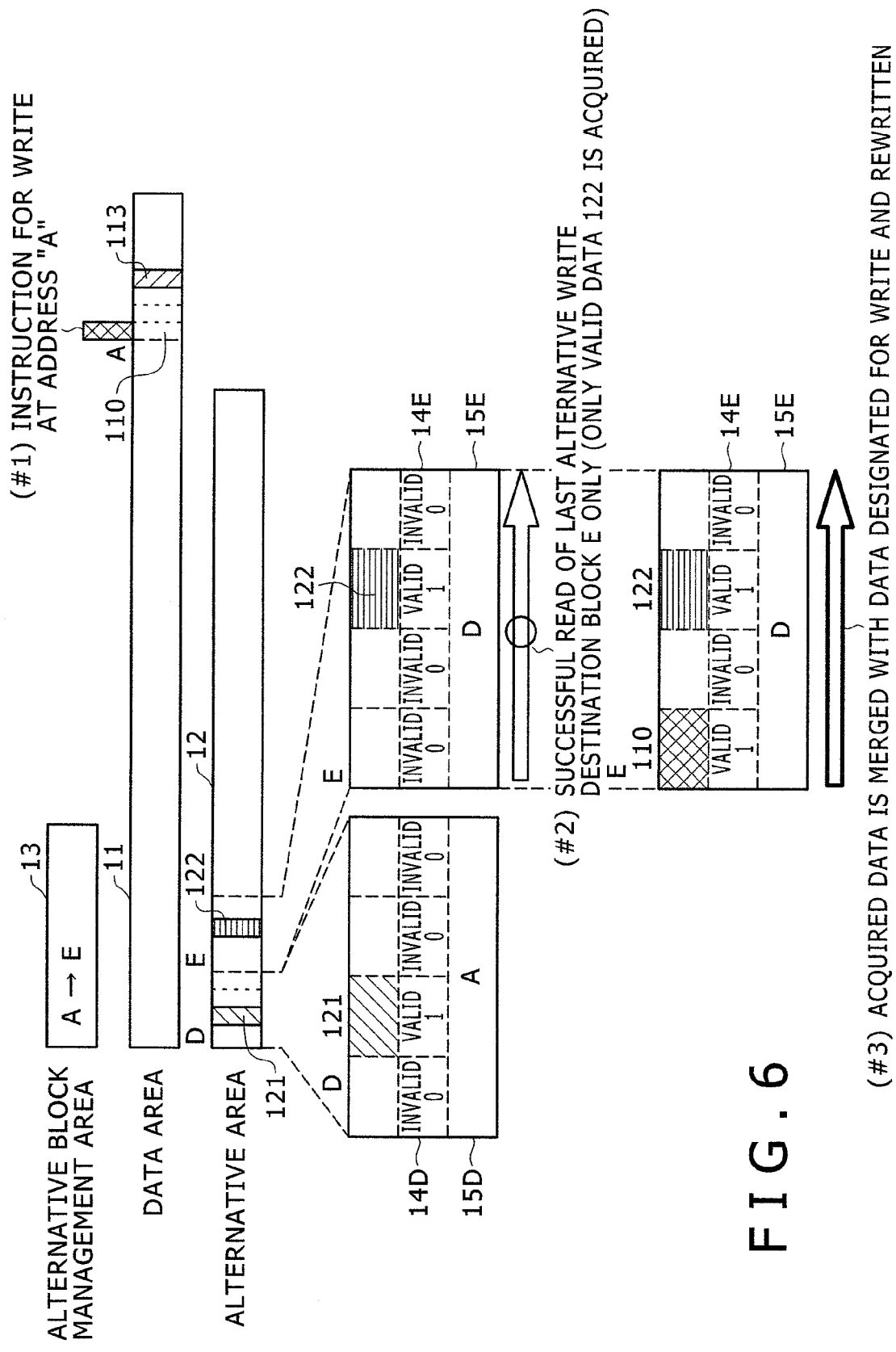
FIG. 6 illustrates an alternative write process according to a second embodiment of the present invention.

FIG. 6 illustrates an alternative write process according to a second embodiment of the present invention. In the process according to the first embodiment, which is described above, a read operation may fail. Therefore, a waste of time may result from alternative write processing. The second embodiment reduces the time required for alternative write processing by reading only the last alternative write destination block, subjecting the acquired valid sector data to a merge, and performing a rewrite.

(1) When an instruction for performing a write in another sector 110 (address "A") of the block is received from the host, the alternative block management area 13 is referenced to find that the last alternative write destination block is at address (2) The alternative write destination block (address "E") is read. The alternative write destination validity flag 14E is referenced to acquire the data in the sector 122 as valid data.

(3) After termination of sector data acquisition, the data in the sector 122 of the block is merged with the data (sector 110) that is designated for a write by the host and rewritten in the last alternative block (address "E"). The time required for alternative write processing can be reduced by limiting the number of writes from the alternative block to 1 as described above.

If the time available for write processing is more than adequate, the number of sector data belonging to the block can be efficiently increased by selecting not only the last alternative write destination block (address "E") but also another alternative write destination block near the former block (near address "E") as a read target.

The present embodiment does not collectively write the data belonging to one block in one block. Therefore, the time required for read processing slightly increases. However, since the unit of host's access for a read is frequently equal to that of its access for a write, the processing time for a read is not likely to cause a problem.

Figure 7:
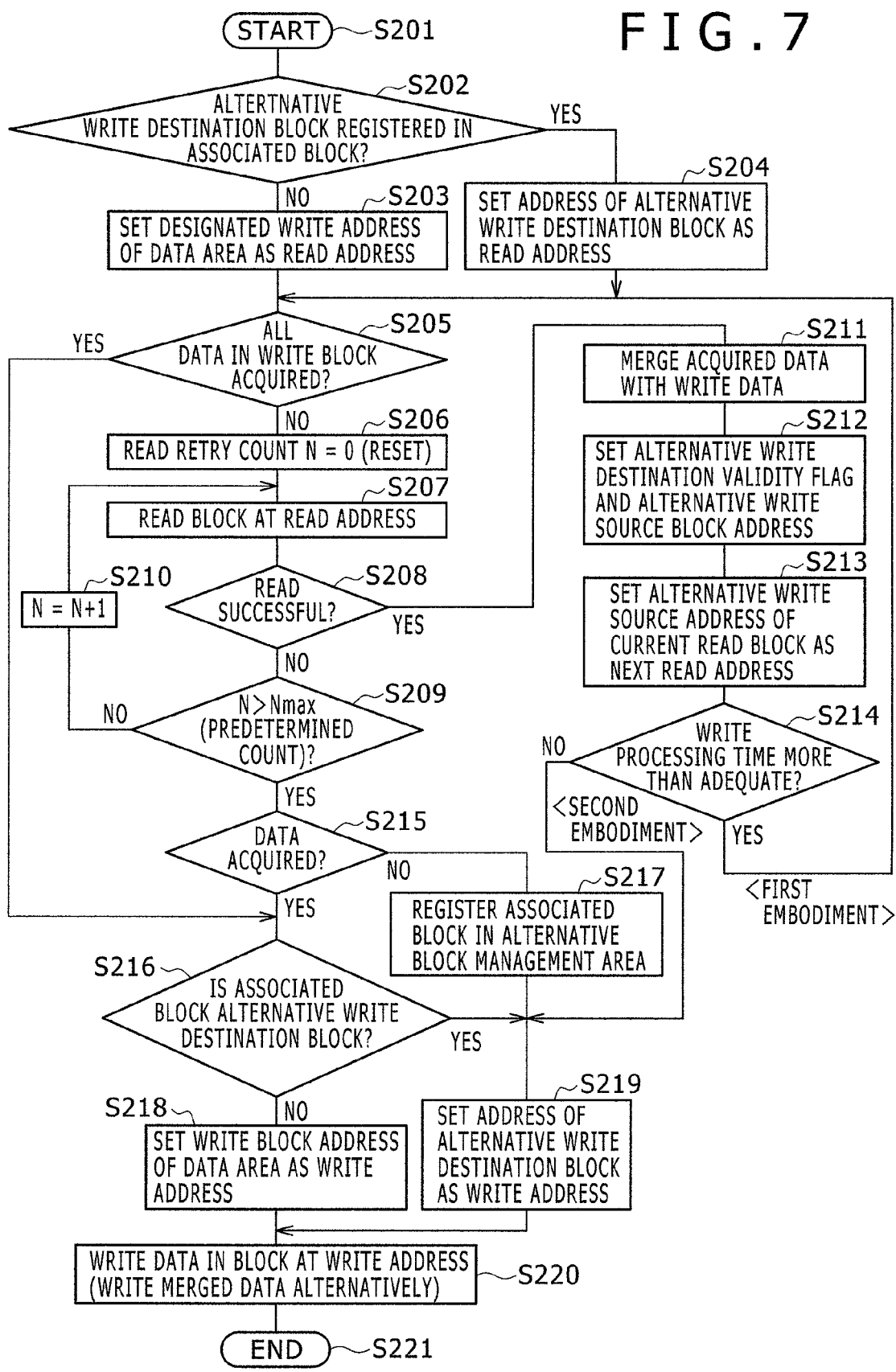
FIG. 7 is a flowchart illustrating the steps of an alternative write processing method according to the present invention.

FIG. 7 is a flowchart illustrating the steps of an alternative write processing method according to the present invention.

When an instruction for writing data in the unit of a sector is received from the host 10, the alternative block management area 13 is referenced to judge whether an alternative write destination block is registered for the associated block address (step S202). If no such alternative write destination block is registered (NO at step S202), the address of a block that is located in the data area 11 and designated for a write is set as a read address (step S203). If, on the other hand, such an alternative write destination block is registered (YES at step S202), the address of the alternative write destination block is set as a read address (step S204).

Next, step S205 is performed to judge whether all the data in the sectors belonging to the block targeted for a write are acquired. If all the data are acquired (YES at step S205), processing proceeds to steps S216 and beyond to perform a write process. If, on the other hand, all the data are not acquired (NO at step S205), the associated block is read to acquire the data. In consideration of the processing time, retries are permitted for a read as far as a predefined maximum number of retries (Nmax) is not exceeded. Step S206 is performed to reset the number of retries N to zero. The block at a read address is then read (step S207), and the read error detection section 64 judges whether the read has been successful (step S208). If the read has been unsuccessful (NO at step S208) and the predefined maximum number of retries (Nmax) is not exceeded (NO at step S209), step S210 is performed to increment a read retry count N by 1. Processing then proceeds to step S207 to reread the same block. If the predefined maximum number of retries (Nmax) is exceeded (YES at step S209), the read operation terminates. If any data is acquired (YES at step S215), processing proceeds to step S216. If no data is acquired, step S217 is performed to register the block in the alternative block management area 13.

If the read is successfully performed in step S208, the acquired other sector data is merged with the sector data designated for a write (step S211). Step S212 is then performed to set the alternative write destination validity flag 14, which indicates that the merged sector is valid, and the alternative write source block address 15, which indicates an alternative write source address, as the alternative write information. Subsequently, the address of the alternative write source block for the last-read block is set as the next read address (step S213).

Next, step S214 is performed to select an alternative write processing method according to either the first embodiment or the second embodiment. If, for instance, the time available for write processing is more than adequate (YES at step S214), the method according to the first embodiment is selected so that processing returns to step S205. In step S205, the remaining data is acquired. The acquired data is subjected to an additional merge in step S211. This operation can be repeated to merge all the data belonging to the write block. If, on the other hand, the time available for write processing is not more than adequate (NO at step S214), the method according to the second embodiment is selected so that processing proceeds to step S219 without acquiring any additional data. In this instance, the processing time can be reduced because only the data obtained from the last alternative block is subjected to a merge.

Next, the acquired data and merged data are written in a predetermined write block. Step S216 is performed to judge whether the block is an alternative write destination block. If the block is not an alternative write destination block, the write block address of the data area is set as a write address (step S218), and then the data is written (step S220). If the block is an alternative write destination block, the address of the alternative write destination block is set as a write address (step S219), and then the merged data is alternatively written (step S220).

The process according to the present embodiment includes a step of selecting an alternative processing method (step S214). Therefore, the process can be performed in accordance with the priority of write processing time. An alternative choice is to additionally read from an alternative block that is positioned within a short access distance, set the number of alternative blocks (the number of sectors) to be read, or limit the processing time and permit a read operation as far as the time limit is observed.

As described above, the present embodiment provides increased user-friendliness because it reduces the read/write processing time required for alternative write processing and makes it possible to select a processing method in accordance with a user's request. The present embodiment can be effectively applied to a recording method and recording medium that permit an alternative write process to be performed in the unit of a sector (in the unit of a logical read/write).

What is claimed is:

1. An optical disc read/write apparatus that performs an alternative write by using an alternative area on an optical disc which includes a plurality of alternative blocks, each of the alternative blocks including a plurality of alternative sectors, if a defect is detected in a write area of the optical disc when an attempt is made to write user data on the optical disc in the unit of a sector, the optical disc read/write apparatus comprising:
    a spindle motor that rotates the optical disc;
    a pickup that irradiates the optical disc with laser light to read/write data;
    a read/write circuit that processes read and write signals for the pickup;
    a servo circuit that controls the rotation of the spindle motor and the movement of the pickup; and
    a microprocessor that controls a data read/write process and an alternative write process in the unit of a sector via the read/write circuit and the servo circuit,
    wherein the microprocessor is configured to:
        check whether a block containing a write sector can be normally read;
        determine, if the block is not successfully read, that the read block is a defective area, and performs an alternative write in the alternative area in the unit of a sector;
        when new data is to be written in a new alternative sector in a situation where user data written in a plurality of alternative sectors corresponding to the same block in the write area are dispersed in different alternative blocks as a result of the alternative write, acquire user data that are dispersed in different alternative blocks; and
        merge acquired data of the other sectors with the new data and rewrite merged data in the same block.

2. The optical disc read/write apparatus according to claim 1, wherein, when there are a plurality of the dispersed other sectors, the microprocessor performs a merge operation after acquiring data from only a sector generated by the last alternative write.

3. The optical disc read/write apparatus according to claim 1, wherein, when there are a plurality of the dispersed other sectors, the microprocessor can set the number of sectors for data acquisition and merge the acquired data with the new data.

4. The optical disc read/write apparatus according to claim 2, wherein the microprocessor additionally acquires data from a sector generated by the last alternative write and from another sector positioned near the former sector, and merges the acquired data with the new data.

5. An alternative write processing method that is used to perform an alternative write by using an alternative area on an optical disc which includes a plurality of alternative blocks, each of the alternative blocks including a plurality of alternative sectors, if a defect is detected in a write area of the optical disc when an attempt is made to write user data on the optical disc in the unit of a sector, the alternative write processing method comprising:

checking whether a block containing a write sector can be normally read;

determining, when the block is not successfully read, that the block is a defective area, and performing an alternative write in the alternative area in the unit of a sector;

when new data is to be written in a new alternative sector in a situation where user data written in a plurality of alternative sectors corresponding to the same block in the write area are dispersed in different alternative blocks as a result of the alternative write, acquiring user data that are dispersed in different alternative blocks; and merging acquired data of the other sectors with the new data, and rewriting merged data in the same block.

6. The alternative write processing method according to claim 5, wherein, when there are a plurality of the dispersed other sectors, data is acquired from only a sector generated by the last alternative write and subjected to a merge.

7. The alternative write processing method according to claim 5, wherein, when there are a plurality of the dispersed other sectors, a number of sectors for data acquisition is set and data acquired from the set number of sectors are merged with the new data.

8. The alternative write processing method according to claim 6, further comprising:

additionally acquiring data from a sector generated by the last alternative write and from another sector positioned near the former sector and merging the acquired data with the new data.

9. An optical disc read/write apparatus comprising:

an optical disc including a data area where data is recorded or reproduced in the unit of block during a data read/write, and an alternative area including a plurality of alternative blocks used for an alternative write which is a read-modify-write (RMW) process performed in the unit of block when a block in the data area that contains a target sector specified for a data write is found defective;

an optical pickup arranged to irradiate light onto an optical disc for the data read/write and the alternative write;

a read/write circuit arranged to perform the data read/write and the alternative write on the optical disc; and a processor unit arranged to control the data read/write and the alternative write, via the read/write circuit, wherein the processor unit is configured to:

upon receipt of an instruction from a host to perform a data write in the unit of a sector, determine if the block containing the target sector can be read from the optical disc;

if the block containing the target sector can be read from the optical disc, record data from the host in the block;

if the block cannot be read, perform the alternative write in the alternative area on the optical disc in the unit of a sector where data written in a plurality of alternative sectors corresponding to the same block in the write area are dispersed in different alternative blocks in the alternative area; and when new data is to be written in a new alternative sector in a situation where data written in the plurality of alternative sectors corresponding to the same block in the write area are dispersed in different alternative blocks as a result of the alternative write, acquire user data that are dispersed in the different alternative blocks, and merge acquired data of the other sectors with the new data and rewrite merged data in the same block, and wherein the processor unit is further configured to set the number of sectors for data acquisition and merge the acquired data with the new data, when there are a plurality of the dispersed other sectors.

10. The optical disc read/write apparatus according to claim 9, wherein, when there are a plurality of dispersed other sectors, the processor unit performs a merge operation after acquiring data from only a sector generated by the last alternative write.

11. The optical disc read/write apparatus according to claim 9, wherein the processor unit additionally acquires data from a sector generated by the last alternative write and from another sector positioned near the former sector, and merges the acquired data with the new data.

* * * * *